Patented June 5, 1945

2,377,571

UNITED STATES PATENT OFFICE 2,377,571

METHOD OF PREPARING TRANS-QUINITOL DIACETATE

Walter Nudenberg, Chicago, Ill., assignor to the United States of America, as represented by the Secretary of Agriculture No Drawing. Application October 27, 1944, Serial No. 560,590

2 Claims. (Cl. 260—496)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to trans-quinitol diacetate and has among its objects the provision of a new and useful method of preparing this compound.

In a copending application for patent Serial No. 560,589 filed concurrently herewith, I have shown that 3,6-epoxycyclohexene may be prepared by reacting ethylene and furan under conditions which effect a 1,4-addition of the ethylene.

According to the present invention, I have found that 3,6-epoxycyclohexene can be converted to trans-quinitol diacetate by catalytic hydrogenation followed by fission of the ether linkage. The reaction proceeds in two steps which may be indicated as follows:

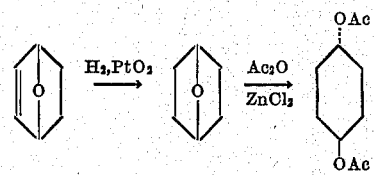

where Ac is acetyl.

The manner of preparing trans-quinitol diacetate according to my invention is illustrated by the following example:

4.5 g. of epoxycyclohexene in 12 ml. of methanol was hydrogenated using 50 mg. of Adams catalyst (platinum dioxide). Distillation of the residue remaining after removal of the catalyst and methanol gave a fraction boiling at 110°–120° C. This material was refluxed, without further purification, with acetic anhydride and several crystals of zinc chloride for two hours. The excess acetic anhydride was distilled off and the remaining brown oil poured into hot water. Crystallization did not occur. The oil was extracted with ether, the solution dried and the ether evaporated. The residual oil on standing deposited crystals, M. P. 102°–103.6° C., from aqueous ethanol. A mixture with authentic trans-quinitol diacetate, M. P. 102°–104° C., also melted at 102°–103.6° C.

Having thus described my invention, I claim:

1. The method of preparing trans-quinitol diacetate which comprises catalytically hydrogenating 3,6-epoxycyclohexene, and effecting a fission of the ether linkage by reacting the hydrogenated intermediate with acetic anhydride.

2. The method of preparing trans-quinitol diacetate which comprises catalytically hydrogenating 3,6-epoxycyclohexene, and then reacting the hydrogenated intermediate thus obtained with acetic anhydride to effect a fission of the ether linkage.

WALTER NUDENBERG.